United States Patent [19]
De Larminat et al.

[11] Patent Number: 6,009,315
[45] Date of Patent: Dec. 28, 1999

[54] CARD READER FOR A PORTABLE TELEPHONE AND A PORTABLE TELEPHONE INCORPORATING THE CARD READER

[75] Inventors: Alain De Larminat, Saumur; Laurent Jubert, Change, both of France

[73] Assignee: U.S. Philips Corporation, New York, N.Y.

[21] Appl. No.: 08/807,168

[22] Filed: Feb. 27, 1997

[51] Int. Cl.[6] ...................................................... H04Q 7/32
[52] U.S. Cl. .............................. 455/90; 235/492; 235/441
[58] Field of Search .................................... 455/450, 551, 455/575, 558, 90, 556, 557; 379/357, 428, 433, 434; 235/441, 492, 486, 482, 375, 380, 449, 349; 436/66, 489

[56] References Cited

U.S. PATENT DOCUMENTS

| | | | |
|---|---|---|---|
| 4,891,013 | 1/1990 | Komaki | 439/512 |
| 5,257,414 | 10/1993 | Trahan et al. | 455/90 |
| 5,436,969 | 7/1995 | Kobayashi | 455/90 |
| 5,574,270 | 11/1996 | Steffen | 235/441 |
| 5,594,233 | 1/1997 | Kenneth et al. | 235/492 |
| 5,599,203 | 2/1997 | Broschard, III | 439/489 |
| 5,615,260 | 3/1997 | Kurgan | 233/441 |
| 5,615,388 | 3/1997 | Yoshimatsu et al. | 235/380 |
| 5,670,769 | 9/1997 | Pernet | 235/441 |
| 5,699,406 | 12/1997 | Liikanen et al. | 455/90 |
| 5,796,093 | 3/1996 | Reichardt et al. | 235/441 |

FOREIGN PATENT DOCUMENTS

0556970A1  8/1993  European Pat. Off. .

*Primary Examiner*—Dwayne D. Bost
*Assistant Examiner*—Jean A. Gelin
*Attorney, Agent, or Firm*—Dicran Halajian

[57] ABSTRACT

An electronic card reader for portable telephones is disclosed for reading an identification card and a micro-card. The identification card reader has a wall with a card supporting side and positioning lugs. A connector is provided having contact terminals which protrude from the card supporting side through an opening in the wall to contact pins of the identification card or the micro-card. A cover presses the identification card or the micro-card against the card supporting side. The positioning lugs are retracted in the card supporting side when the identification card is over the card supporting side, and protrude beyond the card supporting side when the micro-card is over the card supporting side so as to laterally surround the micro-card.

7 Claims, 2 Drawing Sheets

CARD READER FOR A PORTABLE TELEPHONE AND A PORTABLE TELEPHONE INCORPORATING THE CARD READER

FIELD OF THE INVENTION

The present invention relates to an electronic card reader incorporated in a portable telephone and intended for reading a large card of the ISO SIM format, or a small card of the Micro SIM format, these cards having the same contact configuration, this reader comprising a wall with a directly accessible card supporting side and a connector whose contact terminals slightly protrude from said card supporting side through an opening in said wall, and in the operating position a removable cover of said portable telephone being fixed opposite said electronic card reader.

The invention likewise relates to a portable telephone incorporating such a reader.

BACKGROUND OF THE INVENTION

In the field of portable cellular radiotelephones, notably GSM (Global Standard Mobile), for example, a memory circuit, such as an electronic card is known to be used which can be removably inserted into the telephone. Data notably relating to the identity of the user are read from the card which has been inserted and these data are then used during subsequent operation of the apparatus.

The electronic card may be, for example, a card called chip card or smart card of the ISO format which is the format of a common credit card and which has a memory arranged in the form of an integrated circuit. This circuit and its external contacts, or contact terminals, which are flush with the surface of the card in fact occupy only a very small part of this card as regards volume and surface.

In modern telecommunication systems, the applications linked with the use of chip cards are on the increase. One of these applications relates to the circuit called Subscriber Identity Module (SIM) proposed for the pan-European digital cellular radiotelephone system. On this subject reference be made to Recommendation GSM 11.11 of ETSI, which describes the specifications and the recommendations GSM 02.17 which relate to the functional characteristic features of the SIM.

Two different mechanical standards are proposed for the GSM SIM card. The functionalities are the same for the two sizes, but the physical dimensions differ, except for the thickness of the cards which is equal to 0.8 mm. These two standards are the ISO SIM, also called large card in the present text, having the dimensions of a credit card, and the Micro SIM, or small card, which measures 20 mm×25 mill. The ISO SIM is relatively large and the need for smaller cards is felt as the miniaturization continues to reduce the size of the radiotelephone handset itself. The reduction of the card to the Micro SIM format is favourable to this miniaturization effort.

In principle, a radiotelephone is designed for receiving either of the two SIM cards mentioned above which will have to coexist. For a smoother use it is desirable to design a radiotelephone which is suitable for receiving either SIM card. This may be found to be necessary when one wishes to lend one's radiotelephone to a person who has a SIM card of a different format from that of the owner of the apparatus. A solution to this technical problem is known, notably from European Patent No. 0 556 970 Al. The radiotelephone which is described there comprises an adapter which is placed in a cavity so as not to form an obstacle to the insertion of the card when the adapter is arranged in the reading mode of a chip card of the larger format and, when arranged in the reading mode of a Micro SIM card, or smaller format, tilts by means of a pivot link and presses the contact pads of the card against the corresponding terminals of the electronic card reader. The pivotal mounting used presents one drawback: while the adapter is tilted, it protrudes from the body of the apparatus and then becomes vulnerable to shock. Furthermore, this solution is not favourable to a reduced bulkiness in the reader of the radiotelephone, since the latter is suitable for containing the two cards at the same time, the large one in the reading position and the small one in the storage position while the two are overlying each other.

It is an object of the invention to provide a single and robust adapter means for a Micro SIM card in an ISO SIM card reader which adapter means does not increase the cumbersomeness for positioning a card of the ISO SIM format in the card reader.

A further object of the invention is that an adapter means for the Micro SIM card is always irremovably present in an electronic card reader.

A still further object of the invention is that a Micro SIM card is precisel put in the reading position in an electronic card reader in a simple and economic manner.

SUMMARY OF THE INVENTION

According to the invention, these objects are achieved and the drawbacks of the prior art obviated or suppressed due to the fact that the reader defined in the opening paragraph is characterized in that, for holding said small Micro SIM card in the reading position, said wall has positioning lugs which can be retracted by elastic means in the direction of and up to the plane of said card supporting side which they pass through and which, in the rest position, protrude beyond said card supporting side so as to be able to laterally surround said small Micro SIM card with a slight clearance along the various sides, so that the contact pins coincide with the terminals of said connector, said cover, in operation, pressing said card against the supporting side and the card contact pins against the coinciding terminals of said connector.

According to a first preferred embodiment of the invention, said positioning lugs pass through said wall with a slight lateral clearance and, below the wall, are integral with an adapter which is maintained pressed against the wall by said elastic means. For example, the elastic means rest on a printed circuit underlying said wall which comprises said connector in addition to other components, and the elastic means may consist of various tapering lugs and thus be rendered resilient in the adapter itself.

According to a second preferred embodiment of the invention, said positioning lugs consist of elastic lugs provided in said wall by indentations in the wall and of which the free ends are slightly raised in the position of rest above, that is, to the exterior of said card supporting side.

To provide a proper contact between the contact pins of the card and the contact terminals of the connector, said wall can advantageously be manufactured by injection moulding.

These and other aspects of the invention will be apparent from and elucidated with reference to the embodiments described hereinafter.

In the drawings:

BRIEF DESCRIPTION OF THE DRAWINGS

Like references in the Figures represent like elements having like functions.

DESCRIPTION OF PREFERRED EMBODIMENTS

Figure 1:
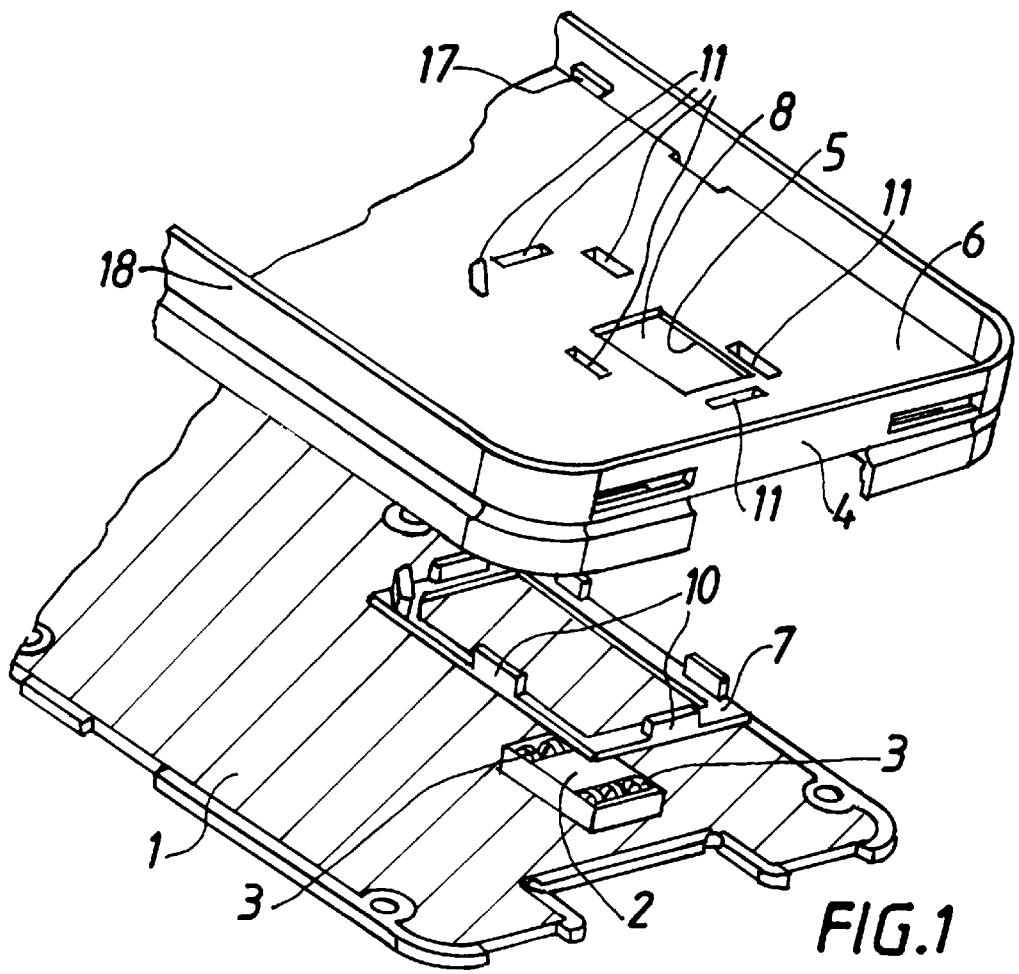
FIG. 1 is a cutaway exploded perspective view of a first embodiment of the invention.
Figure 2:
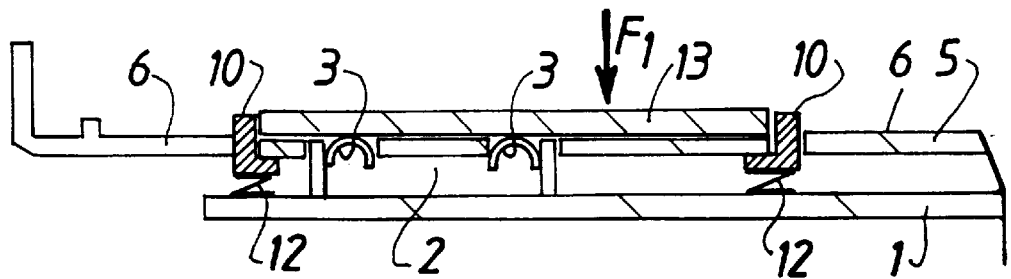
FIG. 2 is a front transversal section showing how the small card is positioned according to the first embodiment of FIG. 1.

From the electronic apparatus shown in FIG. 1, for example, a portable telephone, is only shown an electronic card reader intended for reading a large or small electronic card (neither is shown). For this purpose, a connector 2 having protruding resilient contact terminals such as 3 (among other components which are not shown) is fixed to a printed circuit board 1. A chassis 4 has a wall 5 with a flat outside surface 6. Positioning lugs 10 which, according to a first embodiment of the invention, are integral with an adapter 7 are intended, as shown in FIG. 2, to keep a small electronic card called Micro SIM card in the reading position when the apparatus is a portable telephone, the large card then being a card called chip card which has a format of a credit card and is denoted ISO SIM or also Full SIM card. When the printed circuit card 1 is mounted on the chassis 4, the contact terminals 3 slightly protrude outward beyond side 6 through an opening 8 in the wall 5. In comparable manner, the positioning lugs 10 pass through the side 6 having passed through the openings 11 with a slight lateral clearance which openings are provided in the wall 5. The adapter 7, for example, made of polyacetat is then enclosed between the printed circuit 1 and the wall 5 and remains pressed against the latter by elastic means, for example, such as represented in a diagram at 12 in FIGS. 2 and 3. The adapter 7, preferably forming a loop, may be made of a light metal or, preferably, of plastic material and the elastic means may consist of elastic tapering protrusions which are turned towards the printed circuit 1 and form an integral part of the adapter 7.

In FIG. 2 the positioning lugs 10 enclose with their ends a Micro SIM card 13 with a slight lateral clearance to bring the card contact pins into contact with the contact terminals 3 of the connector 2. A force in the direction of the arrow F1 is exerted on the small card 13 to maintain the latter in place while good electrical contact is ensured by the pressure between the connector 2 and the small card 13. The force F1 is obtained, for example, when a cover (not shown) on chassis 4 is closed.

Figure 3:
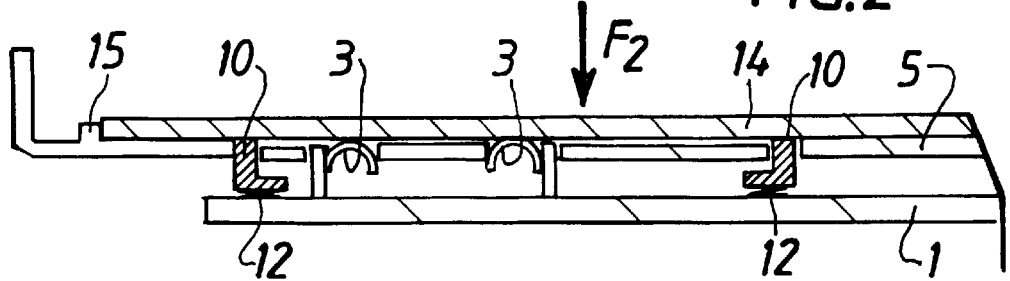
FIG. 3 shows in the same mode of representation as FIG. 2 how the large card is positioned according to the first embodiment of FIG. 1.

In FIG. 3, the small Micro SIM card is replaced by a large ISO SIM card 14, the two cards having the same thickness equal to 0.8 mm. For the large card to be put in place, it is guided laterally by a rim 15 on the wall 5 and by the raised edge 18 of the chassis (FIG. 1) which exactly enclose the card, after the card has been slid underneath lugs 17. The force to be exerted in the direction of the arrow F2 for achieving the correct positioning of the card is higher than that which relates to arrow F1 (FIG. 2) because, in addition to the elastic force of the contact terminals 3, the force F2 is also to overcome that of the positioning lugs 10 until these lugs are completely retracted into and underneath wall 5.

Figure 4:
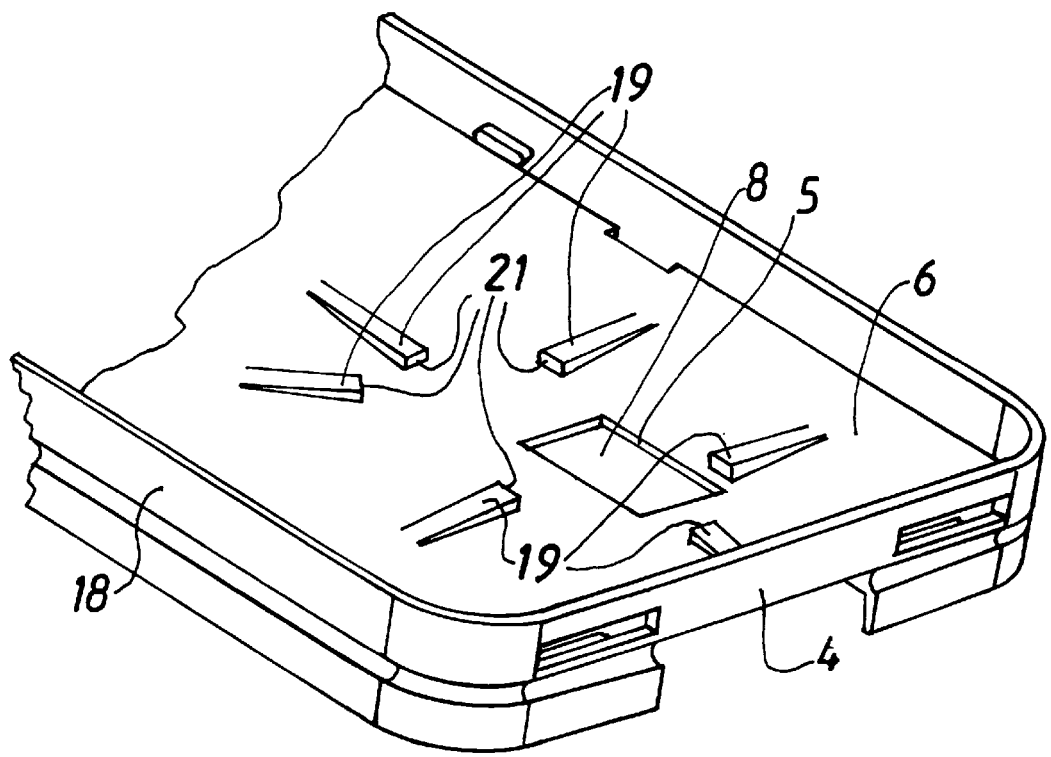
FIG. 4 is a cutaway perspective view of a second embodiment of the invention.

In FIG. 4 is only shown the chassis 4 of the electronic card reader with the wall 5 which has the side 6, the raised edge 18 and the opening 8. For this second embodiment of the invention, the positioning lugs consist of elastic lugs 19 made in the wall 5 itself by indenting this wall. Their free ends are slightly raised by about 1 mm above the supporting surface 6 when there is no pressure on them. For putting the small Micro SIM card in position, it is placed between the ends 21 of the lugs 19. When the Micro SIM card is replaced by the ISO SIM card, the pressure exerted on the latter in the direction of the arrow F2 (FIG. 3) pushes the lugs 19 into their recesses, until they have retracted completely into the wall 5. It will be noted that the lugs 19 may have different forms from those shown in FIG. 4, notably bent forms. Moreover, the indentations of wall 5 for realizing the lugs 19 may render this wall fragile. To compensate for this undesirable effect, the thickness of the wall may be slightly increased relative to that of the first embodiment.

Preferably, for the two embodiments, the wall 5 is made by injection moulding of, for example, polycarbonate.

Figure 5:
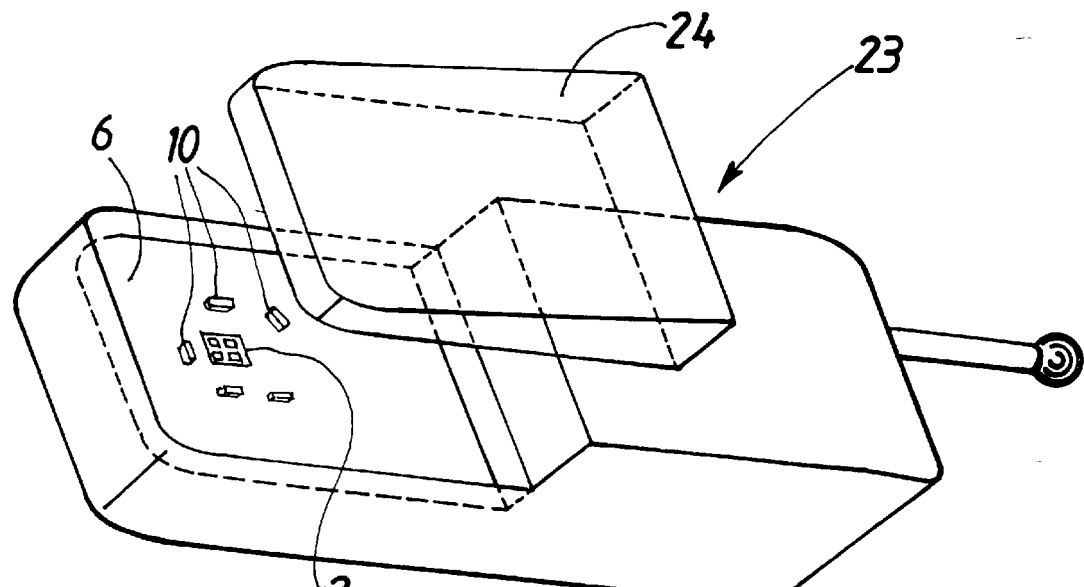
FIG. 5 shows an exploded perspective view of a portable telephone incorporating an electronic card reader according to the first embodiment of FIG. 1.

FIG. 5 gives a perspective diagrammatic view of a portable telephone 23 which incorporates an electronic card reader as described above; in this case it is the first embodiment of the invention that is shown. It is possible to read with it either aln ISO SIM card or a Micro SIM card. As is shown, the portable telephone 23 allay comprise a removable casing 24 which contains, for example, a battery which is used for supplying electric power to the apparatus. The removable casing 24, which serves as a cover makes easy access possible to the connector 2 and when it is made integral with the apparatus, this casing maintains the electronic ISO SIM card or Micro SIM card in the reading position against the surface 6 of the wall 5.

We claim:

1. An electronic card reader incorporated in a portable telephone, said electronic card reader reading an identification card and a micro-card, said identification card and said micro-card having an identical contact configuration, said electronic card reader comprising a wall with a card supporting side and a connector having contact terminals which protrude from said card supporting side through an opening in said wall, wherein, in an operating position, a removable cover of said portable telephone is fixed opposite said electronic card reader, said wall having positioning lugs which are retracted by elastic means in said card supporting side when said identification card is over said card supporting side, and protrude beyond said card supporting side when said micro-card is over said card supporting side so as to laterally surround said micro-card, said cover pressing said identification card or said micro-card against the card supporting side so that card contact pins of said identification card or said micro-card are pressed against the contact terminals of said connector.

2. An electronic card reader as claimed in claim 1, wherein said positioning lugs, below the card supporting side, are integral with an adapter which is maintained pressed against the card supporting side by said elastic means.

3. An electronic card reader as claimed in claim 1, wherein said positioning lugs are elastic lugs provided in said wall by indentations in the wall, said elastic lugs having free ends which are raised above said card supporting side.

4. An electronic card reader as claimed in claim 2, wherein said wall is manufactured by injection molding.

5. A portable telephone incorporating an electronic card reader as claimed in claims 1.

6. An electronic card reader for reading an identification card and a micro-card, said identification card reader comprising:
- a wall having a card supporting side and positioning lugs;
- a connector having contact terminals which protrude from said card supporting side through an opening in said wall to contact pins of said identification card or said micro-card; and
- a cover for pressing said identification card or said micro-card against said card supporting side;
- wherein said positioning lugs are retracted in said card supporting side when said identification card is over said card supporting side, and protrude beyond said card supporting side when said micro-card is over said card supporting side so as to surround said micro-card.

7. A portable telephone having an electronic card reader for reading an identification card and a micro-card, said identification card reader comprising:
- a wall having a card supporting side and positioning lugs;
- a connector having contact terminals which protrude from said card supporting side through an opening in said wall to contact pins of said identification card or said micro-card; and
- a cover for pressing said identification card or said micro-card against said card supporting side;
- wherein said positioning lugs are retracted in said card supporting side when said identification card is over said card supporting side, and protrude beyond said card supporting side when said micro-card is over said card supporting side so as to surround said micro-card.

* * * * *